Jan. 22, 1929.　　　　　　　　　　　　　　　　　　1,699,911
C. PALMER
COUPLING FOR FLEXIBLE METAL HOSE
Filed July 11, 1925
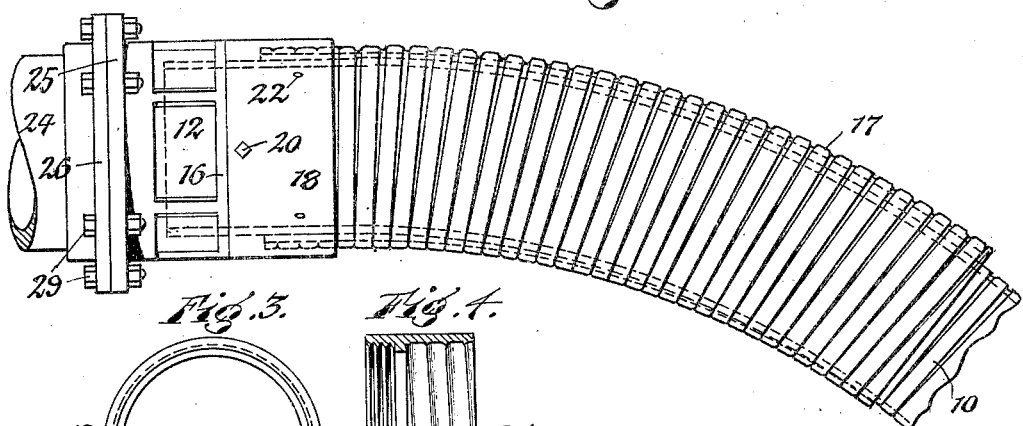
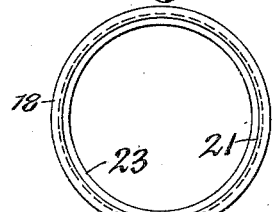
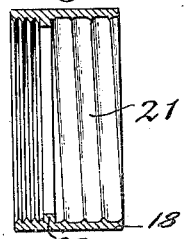
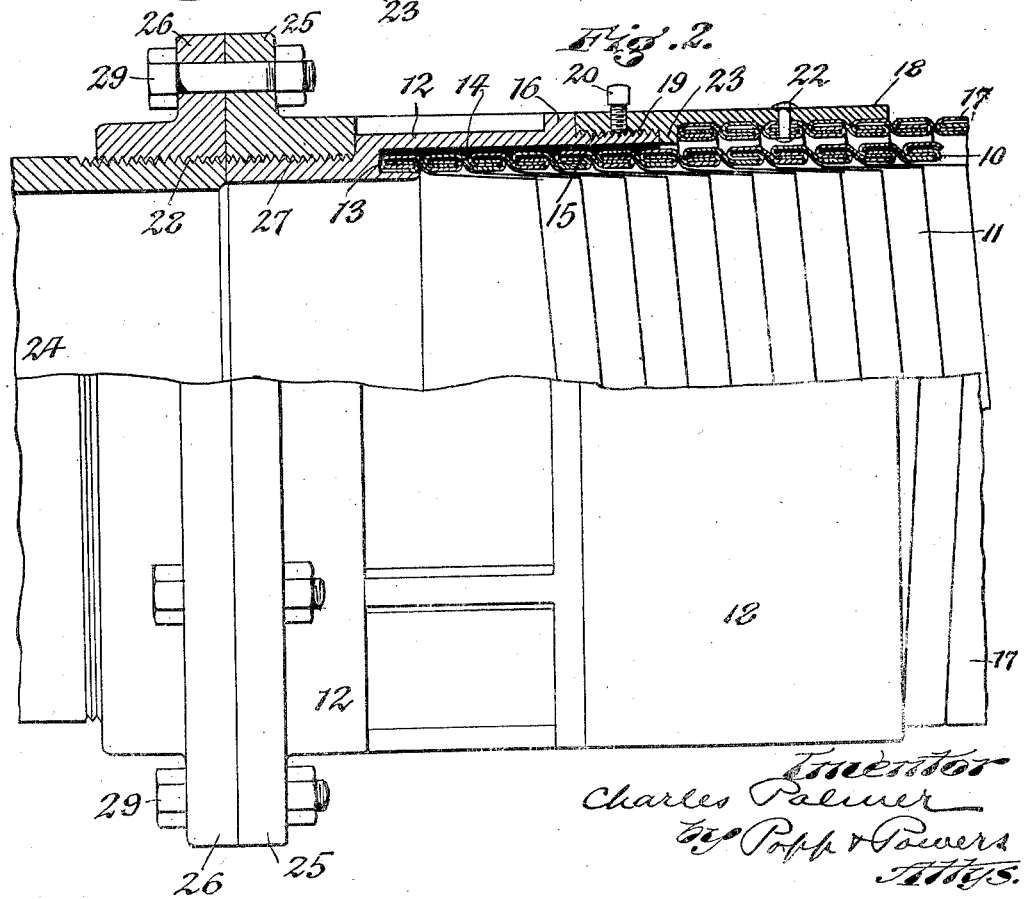
Inventor
Charles Palmer
By Popp & Powers
Attys.

Patented Jan. 22, 1929.

1,699,911

UNITED STATES PATENT OFFICE.

CHARLES PALMER, OF BUFFALO, NEW YORK, ASSIGNOR TO FEDERAL METAL HOSE CORPORATION, OF BUFFALO, NEW YORK, A CORPORATION OF NEW YORK.

COUPLING FOR FLEXIBLE METAL HOSE.

Application filed July 11, 1925. Serial No. 42,984.

This invention relates to a reinforced coupling for a flexible metal hose and has for its object the production of a coupling of this character which will effectively prevent the hose from making a short turn or kink in the hose adjacent to the coupling which otherwise injures the hose and impairs its efficiency. To that end the invention consists of a metal reinforcing tube which surrounds a part of the hose and is secured to the head of the hose coupling and operates to support the latter flexibly for a distance from the coupling head and thus avoid the possibility of forming sharp bends in the hose.

In the accompanying drawings:—

Figure 1 is a side elevation of a flexible metal hose equipped with my improved coupling.

Figure 2 is a fragmentary longitudinal section thereof, on an enlarged scale.

Figure 3 is an end view of the supporting ring forming part of this invention.

Figure 4 is a longitudinal section of the supporting ring.

Similar characters of reference indicate like parts throughout the several views.

In the drawings my invention is applied to a portion of flexible metal hose which may be of any suitable or approved construction and which in the present instance consists of an outer casing 10 formed of a spirally wound and interlocked strip of flexible metal, and an inner lining 11 formed of a spirally wound strip of metal which extends across the joints between the several turns of the casing and practically forms a smooth bore therein.

The numeral 12 represents the tubular head of the coupling which is preferably constructed of metal and provided in its bore between the front and rear ends thereof with an annular channel 13 which opens rearwardly. A part of the flexible hose is arranged within the rear part of the bore of the coupling head and its front end engages with the channel 13 and these members are connected so that they will not pull apart while in use by means of a solder joint 14 between them, as shown in Fig. 2.

On the rear part of the exterior of the tubular head the same is provided with an external screw thread 15 and in front of this thread with an annular stop flange 16 extending circumferentially around the head.

Mounted on the tubular coupling head and surrounding a part of the flexible hose adjacent to the head is a reinforcing tube 17, which is of larger diameter than the hose and yieldingly supports the latter adjacent to the head so that sharp turns or kinks cannot be produced in the hose while using and handling the same. This reinforcing tube is also preferably constructed of a spirally wound and interlocked strip of flexible metal which will conform to the flexible hose as the same is bent while in use but which sustains the hose adjacent to the coupling head and prevents the same from being bent abruptly, thereby avoiding flattening or kinking of the hose which otherwise would not only injure the same and interfere with its flexibility but also might produce a rupture of the same and possible leakage.

Various means may be employed for mounting this reinforcing tube on the coupling head, those shown in the drawings being suitable and constructed as follows:—

The numeral 18 represents a supporting sleeve which is provided on the front part of its bore with an internal screw thread 19 engaging with the external thread 15 on the coupling head and abutting at its front end against the rear side of the stop flange 16. The supporting sleeve is held against unscrewing by a set screw 20 arranged in an opening in the sleeve and engaging the tubular head.

On the rear part of the bore of the supporting sleeve the same is provided with an internal spiral seat 21 which is engaged by the periphery of the front part of said reinforcing tube which is screwed into engagement with said seat for producing a connection between these members. The front end of the reinforcing tube may be held against unscrewing from the supporting sleeve in any suitable manner, for example by means of a rivet 22, and the front end of this tube preferably engages an internal annular stop flange 23 on the bore of this sleeve, as shown in Fig. 2.

The coupling head may be connected with a non-flexible conduit 24 for use in conducting materials by any suitable means. An example of a suitable form is shown in the drawings which consists of two coupling flanges 25, 26 connected respectively by screw joints 27, 28, with the coupling head and conduit and also detachably connected with each other by coupling bolts 29.

This reinforcement is applicable to various forms of flexible metal hose and effectively protects the same against damage or being rendered inoperative, in the manner described, thereby ensuring proper operation of the hose when the same is required for conveying material from one place to another.

I claim as my invention:—

The combination of a main flexible metal hose, a tubular head adapted to be connected at its front end with another tubular member and having the rear part of its bore made of larger diameter than the front end thereof, the front end of said flexible metal hose being secured in the enlarged rear part of the bore of said head by casting solder therebetween, a supporting sleeve surrounding the flexible metal hose and having its front end connected directly with the rear end of said tubular head, and a flexible metal reinforcing tube surrounding said hose and having the periphery of its front part secured in the rear part of the bore of said sleeve.

CHARLES PALMER.